United States Patent Office 2,699,434
Patented Jan. 11, 1955

2,699,434

VINYL CHLORIDE POLYMERS PLASTICIZED WITH DI-2,4,4-TRIMETHYLPENTYL PHTHALATE

Karl Heinrich Walter Turck, Banstead, England, assignor to The Distillers Company Limited, Edinburgh, Scotland, a British company No Drawing. Application July 11, 1950, Serial No. 173,227

Claims priority, application Great Britain July 23, 1949

3 Claims. (Cl. 260—31.8)

The present invention relates to a novel octyl phthalate and to vinyl chloride polymers and copolymers plasticised therewith.

Numerous octyl phthalates are known and have been used as plasticisers for polyvinyl chloride, amongst which may be mentioned di-normal octyl phthalate, di-(2:4-dimethyl - 1 - hexyl) phthalate, di - (5 - methyl - 1 - heptyl) phthalate and di-(2-ethyl-hexyl) phthalate, of which the last named has generally been considered to be the best, and various other esters of these alcohols, such as the sebacate, have been proposed and, in some cases, used.

It has now been discovered that a new ester, namely di-(2:4:4-trimethyl-pentyl-1) phthalate, shows marked superiority when used as a plasticiser for thermoplastic resins containing more than 50% of vinyl chloride units in their molecular structure, the plasticised compositions having, in particular, a greater tensile strength, a greater elongation at break and improved electrical properties, and both the ester itself and its compositions having practically no odour as compared with other octyl esters, especially di-2-ethyl hexyl phthalate.

Amongst the resins which may be plasticised may be mentioned vinyl chloride polymers, and copolymers thereof with a minor proportion of vinyl acetate, vinylidene chloride, alkyl maleates, acrylonitrile and alkyl acrylates, although this list is not to be regarded as limiting with regard to comonomers.

The new ester of this invention may be prepared from the alcohol and phthalic anhydride by distilling with benzene in the presence of sulphuric acid, or at a higher temperature without entrainer, in which case a catalyst is unnecessary, a typical preparation being described in the following example:

EXAMPLE 1

1.56 gram moles of phthalic anhydride, 4.68 gram moles of 2:4:4-trimethyl pentanol-1, 15% by weight of benzene based on the alcohol and phthalic anhydride, and 0.11% by weight of sulphuric acid on the total charge were refluxed in a pot still with decantation of the water of esterification until the reaction was complete, as indicated by acidity determination. The crude ester thus produced was steam distilled first at 120° C. to remove the benzene and subsequently at 180 to 200° C. to remove the alcohol. The isolated ester was washed with 25% aqueous caustic soda solution followed by hot water, then dried under reduced pressure at up to 100° C. The refined product then had an ester content of 99.9% by weight, a phthalic acid content of 0.01% by weight, specific gravity at 20° C. of 0.976, a refractive index of 1.4832 and a boiling range of 156 to 162° C. under 0.4 mm. pressure. The product was substantially odourless, and remained so on storage.

A comparison between two samples of polyvinyl chloride plasticised with 2-ethyl-hexyl phthalate and with the novel ester of this invention can be seen in Examples 2 and 3.

EXAMPLE 2

200 parts by weight of polyvinyl chloride (sold under the trade name Geon 101) were milled for 5 minutes at 130° C. with 100 parts by weight of plasticiser, 14 parts of white lead and 0.25 part of stearic acid to give a smooth white sheet. The sheet was taken off the mill and a part was pressed under 1,000 lbs./sq. in. pressure for 5 minutes at 150° C. between polished steel plates. Standard tensile test specimens were cut from the pressed sheet and tensile strength and elongation figures were obtained using a Hounsfield tensometer. The results, set against the plasticiser used, are given in Table 1.

Table 1

| Plasticiser | Tensile strength, lbs./sq. in. | Percent elongation at break |
|---|---|---|
| Di(2:4:4-trimethyl pentyl-1)phthalate | 3,400 | 430 |
| Di(2-ethyl-hexyl) phthalate | 3,100 | 410 |

From these figures, the novel plasticiser is seen to be substantially superior to the commonly used 2-ethyl-hexyl phthalate in imparting strength to polyvinyl chloride, and it will be understood that great importance attaches even to small increases in the attainable strength of such compositions.

EXAMPLE 3

67 parts by weight of polyvinyl chloride, sold under the trade name Geon 101, were milled for 7 minutes at 150° C. with 33 parts of plasticiser, 4 parts of white lead and 1 part of calcium stearate, and a piece of the resulting sheet was pressed as described in Example 2. Specimens were then cut from the pressed sheet and tested for volume resistivity, specific inductive capacity and power factor, the results obtained with di-2:4:4-trimethylpentyl phthalate (T.M.P.P.) and di-(2-ethylhexyl) phthalate (E.H.P.) plasticisers being shown in Table 2.

Table 2

| Plasticiser | T. M. P. P. | E. H. P. |
|---|---|---|
| Volume Resistivity, ohms/cm.$^3$ | $5.8 \times 10^{14}$ | $2.6 \times 10^{13}$ |
| Specific Inductive capacity, 800 c./s | 3.76 | 5.40 |
| Power Factor, 800 c./s | 0.093 | 0.110 |

The following examples illustrate the use of the novel plasticiser with paste-forming vinyl chloride polymers and show a comparison with the effect of 2-ethyl-hexyl phthalate.

EXAMPLE 4

Standard pastes were made by milling mixtures of the paste-forming polyvinyl chloride (sold under the trade name Geon 121) on an edge-runner mill with an equal part by weight of plasticiser. Gelation tests were made on the pastes thus produced, specimens being cured for 5 minutes at temperatures ranging from 140° C. to 170° C., the tensile strength being measured using small dumb-bell specimens on a Schopper instrument. When cured at 140° C. the specimens plasticised with tri-methyl-pentyl phthalate were 200 lbs./sq. in. stronger than those plasticised with 2-ethyl-hexyl phthalate, while when cured at 170° C. the increase in tensile strength resulting from the use of the novel plasticiser was 500 lbs./sq. in.

EXAMPLE 5

Polyvinyl chloride-plasticiser pastes were prepared by mixing the ingredients shown in Table 3 in an end runner mill at room temperature for 30 minutes. The paste-forming vinyl chloride polymer used was a commercial grade known as Geon 121. The resulting paste was deaerated under vacuum, and samples of the deaerated pastes were spread in a stainless steel mould, 7" x 7" x 0.25" with a cavity 4.5" x 4.5" x 0.020", covered by a top plate 0.07" thick. The moulding assembly was heated under carefully controlled conditions of temperature under a total applied pressure of 3,600 lbs. weight, applied by 6" x 6" platens. The temperature was regulated so that the nominal curing temperature was reached in 1½ minutes, and maintained for 6 minutes. At the end of this period pressure was released, the mould was removed from the press and rapidly cooled. From the moulded sheet obtained, tensile test specimens were cut and conditioned at 25° C., 43% relative humidity, for 20 hours before being broken on a Schopper tensometer working at a crosshead of 10″ per minute. All tests were performed at 18°±1° C. Table 3 gives the average ultimate tensile strengths based on 15–20 specimens in each case. All the pastes obtained before gelation were smooth, showed good flow and were readily spreadable.

*Table 3*

| | | | | | | | | |
|---|---|---|---|---|---|---|---|---|
| Polyvinyl Chloride (Geon 121) parts by wt | 50 | 50 | 50 | 50 | 60 | 60 | 60 | 60 |
| Di-(trimethylpentyl phthalate) parts by wt | 50 | ---- | 50 | ---- | 40 | ---- | 40 | ---- |
| Di-(2-ethylhexyl) phthalate, parts by wt | ---- | 50 | ---- | 50 | ---- | 40 | ---- | 40 |
| Leadstearate, parts by wt | 3 | 3 | 3 | 3 | 3 | 3 | 3 | 3 |
| Curing temperature (° C.) | 140 | 140 | 170 | 170 | 125 | 125 | 155 | 155 |
| Av. tensile strength, lbs./sq. in | 870 | 630 | 2,140 | 1,630 | 770 | 670 | 2,500 | 2,070 |

The unexpected character of the advantages gained from the use of the novel plasticiser becomes particularly apparent when other esters are considered. Thus, in the case of the sebacate, which may be prepared substantially as described in Example 1, using sebacic acid instead of phthalic anhydride, a mix prepared as described in Example 2 and formed into test specimens attains an ultimate tensile strength of only 2430 lbs./sq. in. and a 400% elongation at break compared with an ultimate tensile strength of 2610 lbs./sq. in. and a 420% elongation at break in the case of 2-ethyl-hexyl sebacate; further the tri-methyl-pentyl sebacate mix was difficult to mill and needed at least 10 minutes at a temperature of 140° C. to give a homogeneous sheet on the rolls.

The amounts of di-2:4:4-trimethyl pentyl phthalate which may be used with vinyl chloride polymers are similar to those previously adopted for other dioctyl phthalates, and 5–150%, based on the resin, is suitable.

We claim:
1. A plasticised composition comprising a polymeric resin having a major proportion of vinyl chloride units in its molecular structure and di-2:4:4-trimethylpentyl phthalate in the proportion of 5–150% of the resin.
2. A plasticised composition comprising a vinyl chloride polymer containing a major proportion of vinyl chloride units and 50% by weight thereof of di-2:4:4-trimethylpentyl phthalate.
3. A spreadable paste comprising a paste-forming vinyl chloride polymer containing a major proportion of vinyl chloride units and 40–50% by weight thereof of di-2:4:4-trimethylpentyl phthalate.

References Cited in the file of this patent

UNITED STATES PATENTS

| | | |
|---|---|---|
| 2,015,077 | Lawson | Sept. 24, 1935 |
| 2,091,241 | Kvalnes | Aug. 24, 1937 |
| 2,325,951 | Gresham | Aug. 3, 1943 |
| 2,450,435 | McGillicuddy | Oct. 5, 1948 |
| 2,462,601 | Bohrer | Feb. 22, 1949 |
| 2,517,352 | Reid | Aug. 1, 1950 |